US007555181B2

(12) United States Patent
Temple, Jr. et al.

(10) Patent No.: US 7,555,181 B2
(45) Date of Patent: *Jun. 30, 2009

(54) FIBER OPTIC CABLES HAVING AT LEAST ONE TETHER OPTICAL FIBER

(75) Inventors: Kenneth D. Temple, Jr., Newton, NC (US); David L. Dean, Jr., Hickory, NC (US); Jody L. Greenwood, Hickory, NC (US); Warren W. McAlpine, Hickory, NC (US); Keith H. Lail, Connelly Springs, NC (US); Craig M. Conrad, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 70 days.

This patent is subject to a terminal disclaimer.

(21) Appl. No.: 11/312,701

(22) Filed: Dec. 20, 2005

(65) Prior Publication Data

US 2007/0140640 A1  Jun. 21, 2007

(51) Int. Cl.
 *G02B 6/44* (2006.01)
(52) U.S. Cl. ...................... 385/100; 385/115
(58) Field of Classification Search .................. 385/100, 385/115
See application file for complete search history.

(56) References Cited

U.S. PATENT DOCUMENTS

| 5,121,458 | A | 6/1992 | Nilsson et al. ............... 385/100 |
| 5,125,060 | A | 6/1992 | Edmundson ................. 385/100 |
| 5,210,812 | A | 5/1993 | Nilsson et al. ............... 385/100 |
| 5,440,665 | A | 8/1995 | Ray et al. ..................... 385/135 |
| 5,528,718 | A * | 6/1996 | Ray et al. ..................... 385/136 |
| 7,127,143 | B2 * | 10/2006 | Elkins et al. ................. 385/100 |
| 7,203,404 | B2 * | 4/2007 | Greenwood et al. .......... 385/112 |
| 2006/0093278 | A1 * | 5/2006 | Elkins et al. ................... 385/76 |
| 2006/0120672 | A1 * | 6/2006 | Cody et al. ..................... 385/86 |

* cited by examiner

*Primary Examiner*—Jennifer Doan
(74) *Attorney, Agent, or Firm*—C. Keith Montgomery

(57) ABSTRACT

A distribution fiber optic cable including a plurality of optical fibers, a main cable body with some of the plurality of optical fibers being disposed within the main cable body, at least one tether optical fiber, and a cable jacket. The at least one tether optical fiber is one of the plurality of optical fibers that transitions during manufacturing from a first location within the main cable body to a tether access location for a portion of the distribution cable. The cable jacket includes a main cable body jacket and a tether access jacket portion that are connected together by a continuous transition that is applied during cable manufacturing. Thus, the craftsman may conveniently access the at least one tether optical fiber for distribution into the optical network.

24 Claims, 16 Drawing Sheets

FIBER OPTIC CABLES HAVING AT LEAST ONE TETHER OPTICAL FIBER

RELATED APPLICATIONS

The present application is also related to U.S. patent application Ser. No. 11/312,621 titled "METHODS FOR MAKING FIBER OPTIC CABLES HAVING AT LEAST ONE TETHER OPTICAL FIBER" filed on even date herewith, the disclosure of which is incorporated herein by reference.

FIELD OF THE INVENTION

The present invention relates generally to optical fiber cables used for the distribution of optical fibers toward the subscriber. More specifically, the present invention relates to optical fiber cables having at least one tether optical fiber disposed at a predetermined tether access location for distributing the optical fiber network toward the subscriber and methods for making the cables.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical fiber cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from fully utilizing the relatively high-bandwidth capacity of the optical fiber long-hauls links.

As optical fibers are deployed deeper into communication networks, subscribers will have access to increased bandwidth. But certain obstacles exist that make it challenging and/or expensive to route optical fibers/optical cables toward the subscriber. For instance, the connection of subscribers to the distribution fiber optic cable requires a low-cost solution that is craft-friendly for installation, connectorization, and versatility. Moreover, the reliability and robustness of the distribution fiber optic cable may have to withstand the rigors of an outdoor environment.

SUMMARY OF THE INVENTION

The present invention is directed to distribution fiber optic cables and methods for making the same. More specifically, the distribution fiber optic cables include a plurality of optical fibers disposed within a main cable body, at least one tether access location, and a cable jacket having a continuous transition to the tether access location. The tether access location includes at least one tether optical fiber that is a portion of a tether port or a portion of a tether cable. During manufacturing of the distribution cable, one of the plurality of optical fibers transitions from a first location to a second location within the cable such as from within the main cable body to the tether access location for a portion of the distribution cable, thereby becoming the at least one tether optical fiber.

Moreover, the cable jacket applied during cable manufacturing has a continuous cable jacket about one or more tether access locations, which may be configured as a tether port and/or tether cable. Consequently, with distribution cables of the present invention the craftsman can quickly and easily access the tether optical fiber at the tether access location, thereby simplifying the distribution of optical fiber(s) in an optical network. In other embodiments, the tether optical fiber may return to the main cable body from the tether access location. Additionally, distribution cables or cable assemblies may include other suitable components such as water-blocking components, tensile strength components, and connectorization components such as ferrules, connectors, receptacles, or the like.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain principals and operations of the invention.

DETAILED DESCRIPTION OF THE INVENTION

Figure 1:
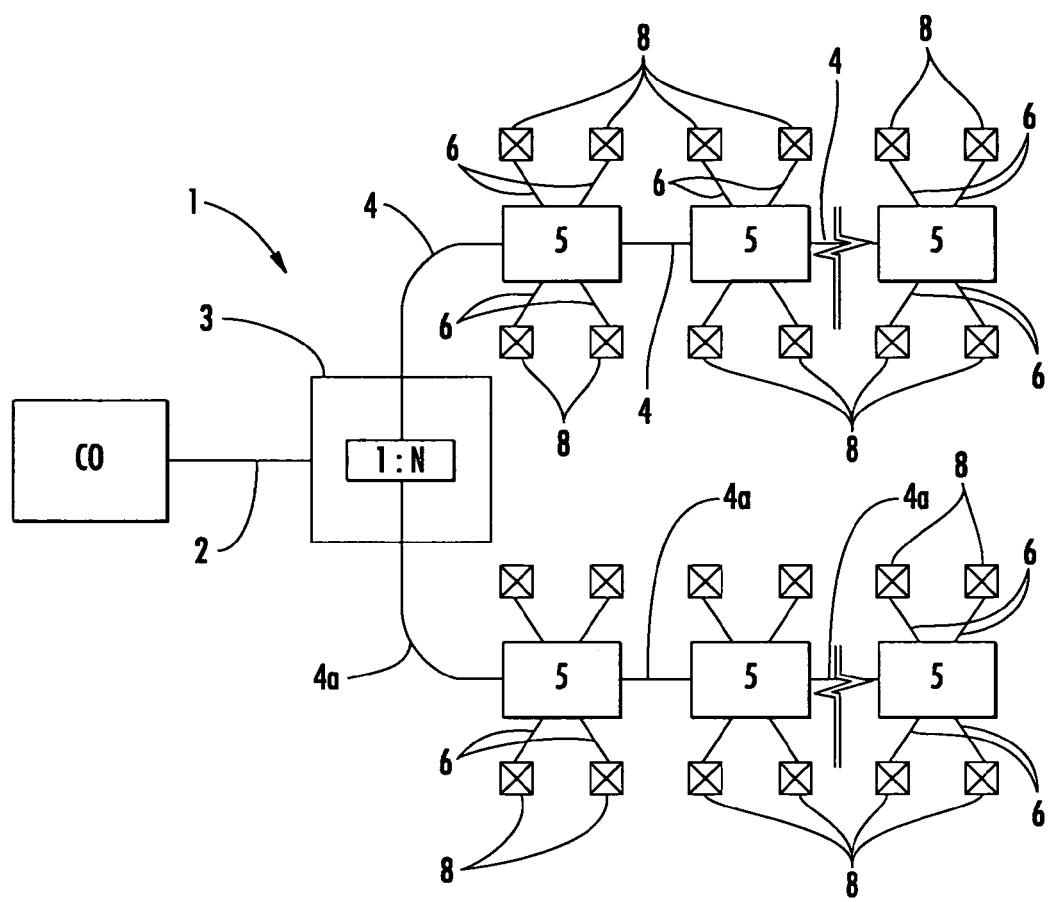
FIG. 1 schematically depicts a portion of an optical communication network for providing optical fiber to the premises (FTTP) of the subscriber.

FIG. 1 schematically depicts a portion of a simplified optical fiber network 1 in an explanatory fiber to the premises (FTTP) architecture. FTTP architectures advantageously route at least one optical fiber to a premises 8, thereby providing a high bandwidth connection to the subscriber. In this case, network 1 is a centralized splitting architecture depicting fiber to the premises (FTTP), but other suitable applications such as fiber to the curb (FTTC) are possible with the concepts of the present invention. As shown, downstream from a central office CO, network 1 includes a feeder link 2, at least one fiber distribution hub (FDH) 3 having at least one 1:N splitter (not numbered), a plurality of distribution links 4,4a, a plurality of distribution terminals 5, and a plurality of drop links 6 routed to respective premises 8. In this instance, feeder link 2 is routed to the FDH where the optical fiber of feeder link 2 is split 1:N times. In this simplified network representation the splitter may be a 1:32 configuration, but other suitable splitter configurations are possible for splitting a plurality of feeder link optical fibres at the FDH. The splits from the 1:N splitter are in optical communication with the respective distribution links 4,4a that feed optical signals downstream toward the subscribers.

As schematically depicted, distribution links 4,4a have multiple access locations disposed at the respective distribution terminals 5 along the length of the distribution links 4,4a. Illustratively, distribution link 4 has three distribution terminals 5 where nodes exist for the connection of multiple premises 8 using respective drop links 6. In other words, the desired number of optical fibers are provided from distribution link 4 to distribution terminal 5 such as at a network access point, thereby providing or distributing optical fibers toward the premises 8. In this example, four optical fibers are provided at each distribution terminal 5, but any suitable numbers of optical fibers may be provided at distribution terminal 5 for connection to the respective drop links. Of course, network 1 is explanatory and fiber optic cables of the present invention may be used with any other suitable optical network. For instance, optical networks may include other suitable components such as distribution terminals, closures, amplifiers, couplers, transducers, or the like.

Although, network 1 shows a simplified centralized splitting FTTP architecture, the concepts of the present invention are advantageous with other optical networks architectures such as distributive splitting architectures. Likewise, network 1 is depicted as an outdoor application, but indoor network applications like for multiple-dwelling units (MDUs) can use cables of the present invention. Furthermore, the concepts of the present invention may be useful with other network configurations requiring the distribution or connection of optical and/or electrical communication elements such as antennas or transmission equipment.

Distribution fiber optic cables according to the present invention are advantageous as distribution links 4,4a because the cables provide at least one tether access location having at least one tether optical fiber, thereby providing quick and easy access for distribution of the optical fibers in the field or factory. In other words, distribution fiber optic cables having tether access locations effectively and economically streamline the deployment and connectivity of optical fibers in FTTx applications along the length of the distribution cable by providing at least one tether optical fiber apart from the main cable body. Access is quick and easy since the craft does not need to find the correct optical fiber(s) to use within the main cable body because the optical fiber(s) is presented at the tether access location. Additionally, the craft may also avoid opening and resealing of the main cable body in some embodiments when connecting to the tether optical fiber. Consequently, using cables of the present invention saves the craft time, inhibits damage to the cables, and allows quicker and easier deployment of the optical network. Also, preconnectorization of the tether optical fiber with a ferrule, connector, receptacle or the like is also possible with the present invention for providing plug and play connectivity.

Distribution fiber optic cables of the invention may be manufactured using pressure extrusion tooling that modifies the jacket cross-sectional shape as the cable components that form the tether access location approach and pass therethrough. Additionally, cables of the invention may be manufactured using methods such as vacuum draw-down extrusion that result in the cable jacket having a changing cross-sectional shape. At any rate, cables of the invention have cable jackets with cross-sections that change along portions of the cable at or near the tether access locations.

Cables of the present invention create the tether access location by transitioning an optical fiber from a first location to a second location within the cable. For instance, one or more optical fibers or optical fiber carriers may move from: (1) the main cable body into the tether access location; and/or (2) from the tether access location into the main cable body. "Optical fiber carrier" means any protective structure that carries a portion of an optical fiber such as a tube, a tight-buffer layer, a ribbon matrix material, a U-shaped fiber carrier, a sheath or any other suitable carrier for protecting the optical fiber and/or the tether optical fiber.

Figure 2:
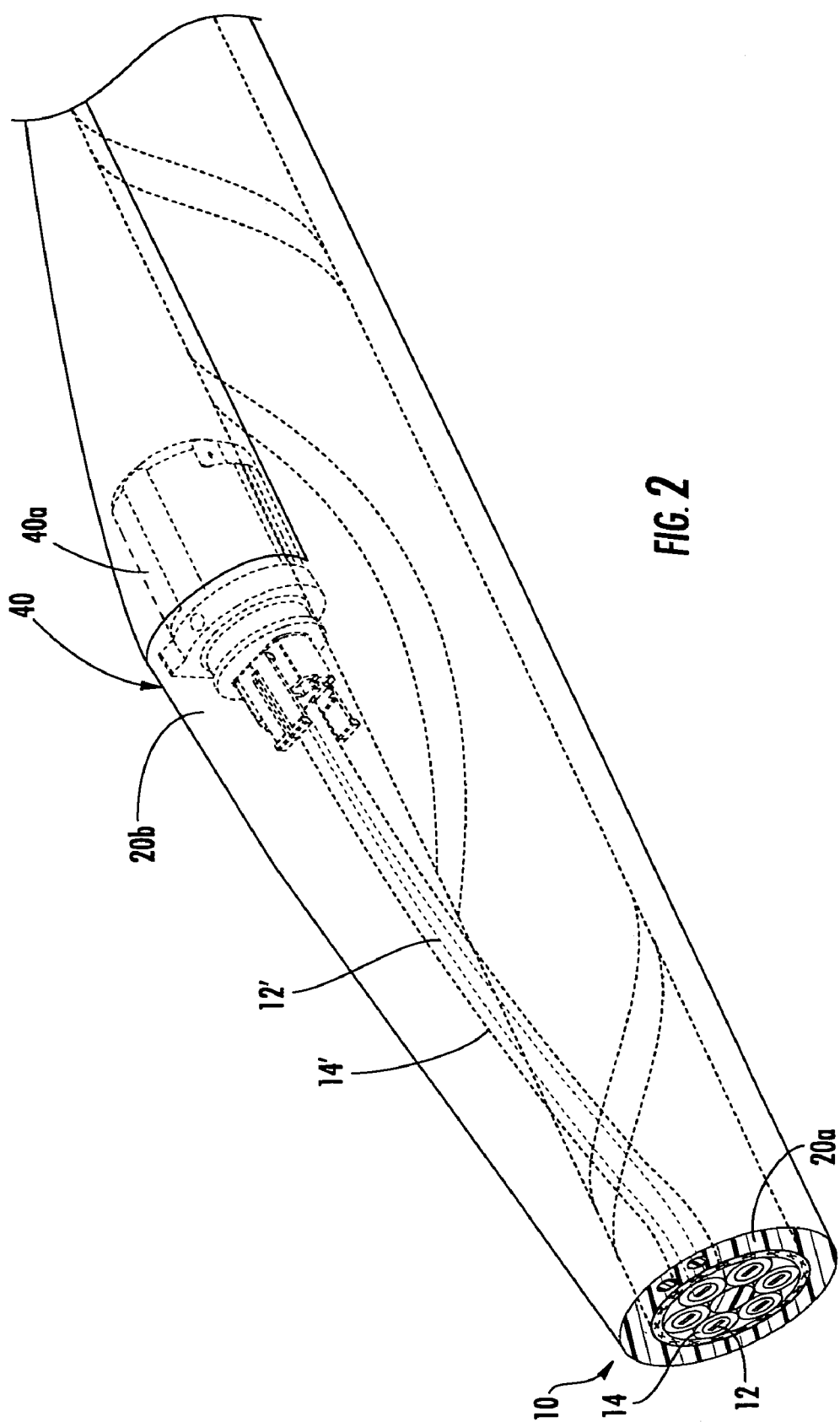
FIG. 2 is a perspective view of a distribution fiber optic cable according to one embodiment of the present invention where the tether access location is configured as a tether port.
Figure 3:
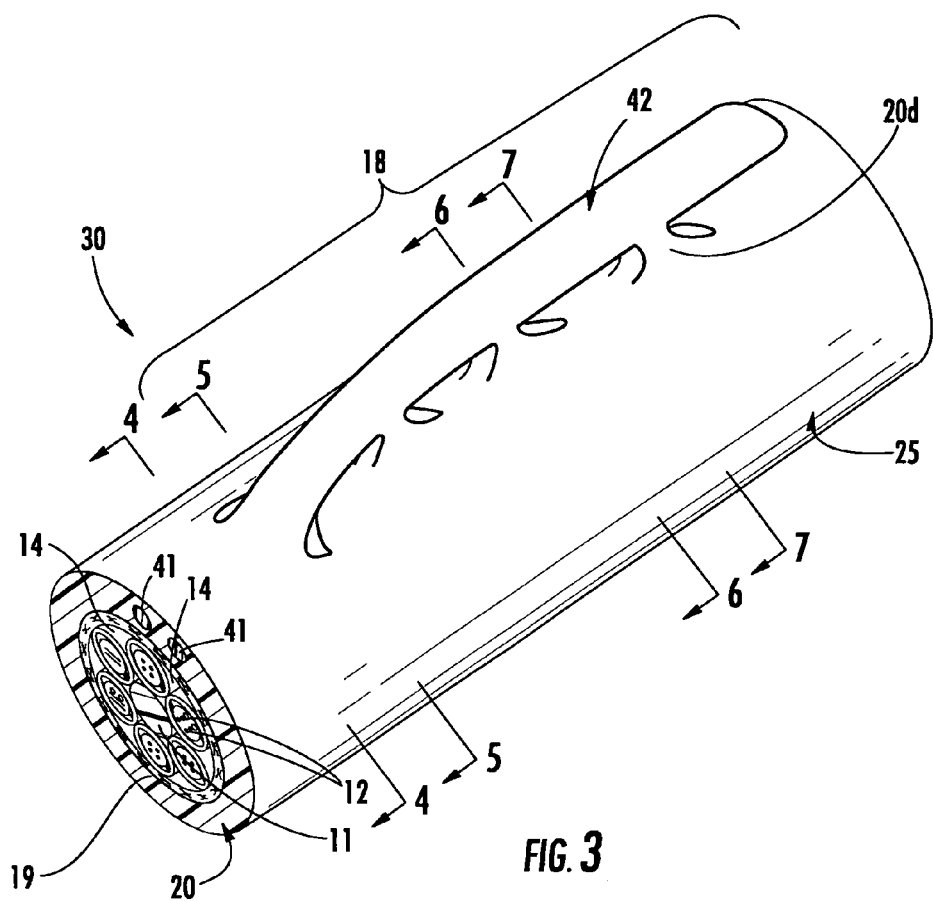
FIG. 3 is a perspective view of a distribution fiber optic cable according to another embodiment of the present invention where the tether access location is configured as a tether cable.

By way of example, cables 10 and 30 of FIGS. 2 and 3 depict a plurality of optical fibers 12 disposed within a fiber optic carrier (i.e. tube 14) that transition from a first location within the main cable body 25 to the second location within a tether access location 18. Simply stated, tubes 14 of the cables becomes tether tubes 14' that are disposed apart from the main cable body in the tether access location. Likewise, the plurality of optical fibers 12 in tube 14 become the tether optical fibers 12' disposed at the respective tether access locations. Furthermore, the tether access location is configured as a tether port 40 in cable 10 of FIG. 2 and as a tether cable 42 in cable 30 of FIG. 3.

Generally speaking, the tether port protrudes from the main cable body and extends for a relatively short distance along the cable such as about 30 centimeters or less, but the tether port is not configured for separation from the main cable body. Whereas the tether cable is configured for separation from a portion of the main cable body and may extend for a suitable distance along the distribution cable.

Specifically, FIG. 2 depicts a perspective view of an exemplary distribution fiber optic cable (hereinafter cable) 10 having at least one tether access location (not numbered) configured as tether port 40. In this cable, tether port 40 includes a ribbon having at least one tether optical fiber 12' disposed within tether tube 14'. During manufacturing, the tube 14 transitions from a first location within the main cable body 25 to a second location within tether port 40. As shown in FIG. 2, tether tube 14' and the ribbon are dedicated to the depicted tether port 40. Dedicated means that tether optical fiber(s) and/or optical fiber carrier ends within the given tether access location. This embodiment also includes optional components for plug and play connectivity at tether port 40. Specifically, tether port 40 includes a ferrule (not numbered) that, for example, is a portion of a receptacle 40a for receiving a respective mating plug connector as disclosed in U.S. patent application Ser. No. 10/765,434.

By making the transition to tether port 40, tether optical fibers 12' of the ribbon are disposed apart from main cable body 25, thereby presenting the same for distribution toward the subscriber. As an optical fiber transitions from the main cable body 25 to the tether port 40 (or the tether cable as shown in FIG. 3) during manufacturing to become tether optical fiber 12', the cross-section of a cable jacket 20 being applied to the cable changes shape to form the tether port (or tether cable). More specifically, a portion of cable jacket 20 applied near the tether port 40 includes a tether port jacket portion 20b that is attached and protrudes from a main body cable jacket 20a.

Cable 10 includes a plurality of optical fibers 12 disposed within main cable body 25. Specifically, main cable body 25 includes a plurality of tubes 14 each preferably having at least one optical fiber 12 disposed therein that are stranded about a central member 11 and generally surrounded by cable jacket 20. Tube 14 may house any suitable components such as loose optical fibers, ribbons, fiber bundles or other components such as a water-swellable thread or yarn 14a. Main cable body 25 of cable 10 also includes an optional cable core binder (not visible) for securing the cable core, at least one filler component (not visible), and an optional water-swellable component 19 such as a water-swellable tape or thread for inhibiting the migration of water along the cable. Generally speaking, filler component(s) 17 as shown in FIG. 3 may be introduced into main cable body 25 to maintain the round shape of the cable after one of the optical fibers or tubes transitions to the tether port (or tether cable) as will be discussed herein.

FIG. 3 depicts a perspective view of another exemplary cable 30 similar to cable 10, but having the tether access location 18 configured as a tether cable 42. Although, cables 10 and 30 are stranded loose tube cable constructions, other suitable types of cable constructions may use the concepts of present invention. As with cable 10, cable 30 includes a plurality of optical fibers 12 disposed within main cable body 25. Again, tether optical fiber(s) 12' is one of the plurality of optical fibers 12 initially within a first location such as main cable body 25 and transitions during manufacturing to a second location such as within tether cable 42. In other words, as illustrated in the cross-sections of FIGS. 4-7, at a predetermined position one of the tubes 14 transitions from main cable body 25 to tether cable 42 for a predetermined length before ending, thereby becoming the dedicated tether tube 14' and tether optical fibers 12'. For instance, the predetermined length is about 3 meters for tether cable 42. Of course, the tether cable 42 can extend for as much as 30 meters or more before ending.

Like cable 10, main cable body 25 of cable 30 includes a plurality of tubes 14 each preferably having at least one optical fiber 12 disposed therein that are stranded about central member 11 and generally surrounded by cable jacket 20. Cable jacket 20 is applied during cable manufacturing and includes a main cable body jacket 20a and a tether cable jacket portion 20c, thereby forming the at least one tether cable 42 with main cable body 25.

Figure 5:
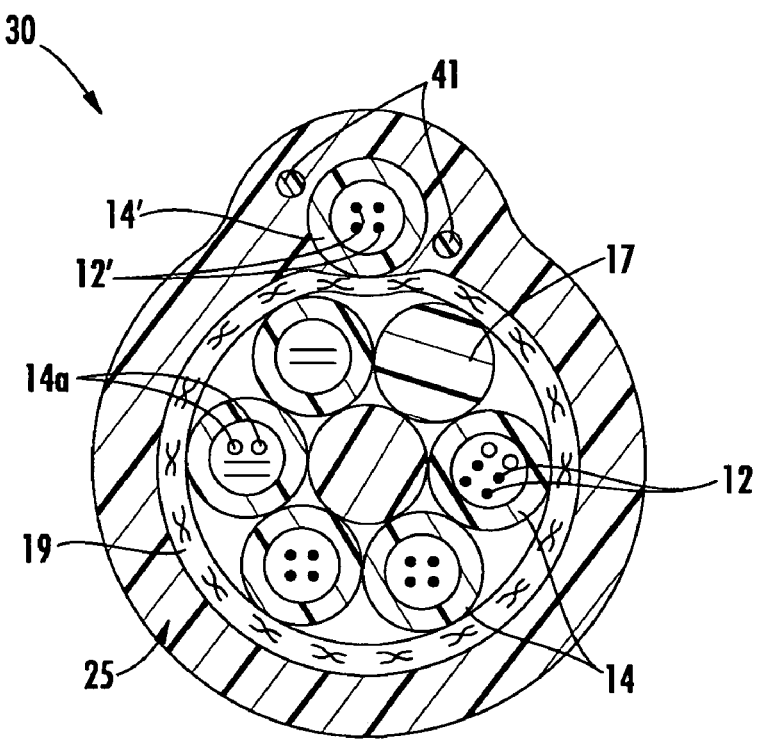
FIG. 5 is a cross-sectional view of the distribution fiber optic cable of FIG. 3 taken along line 5-5.
Figure 6:
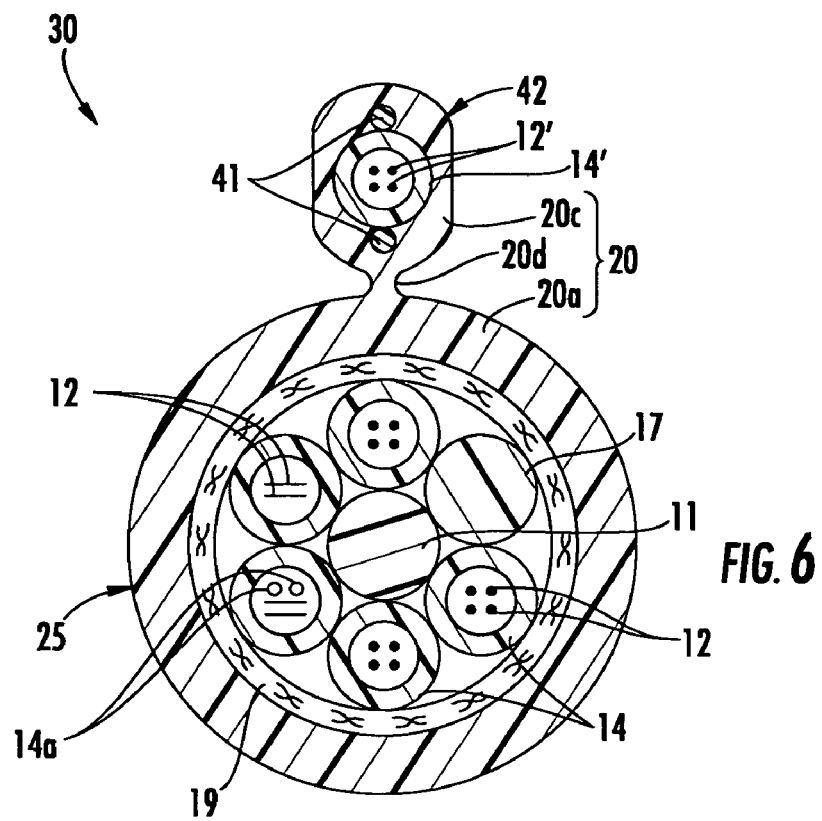
FIG. 6 is a cross-sectional view of the distribution fiber optic cable of FIG. 3 taken along line 6-6.
Figure 7:
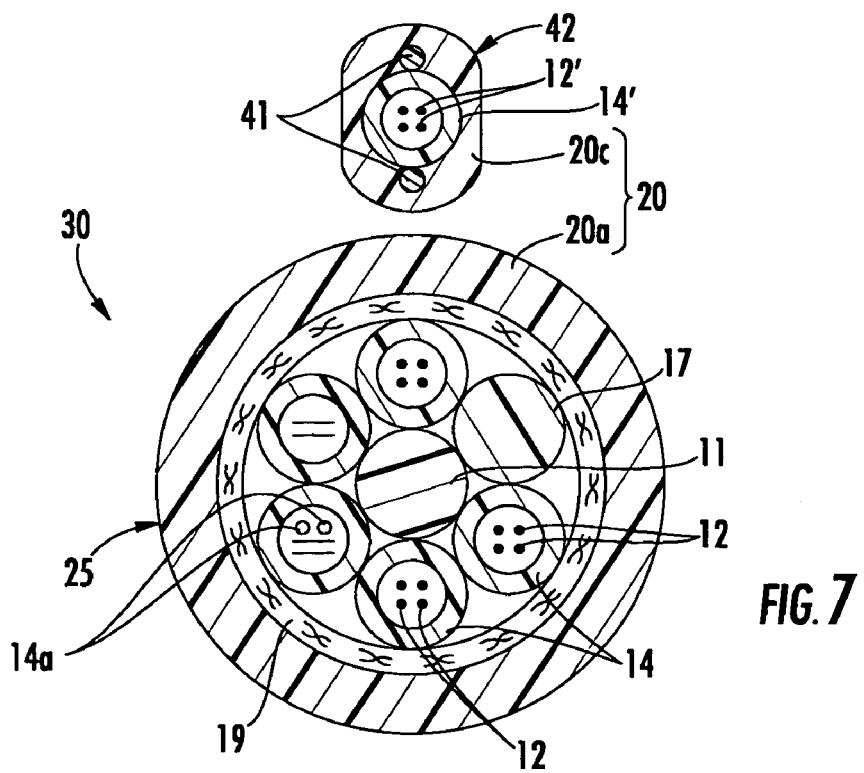
FIG. 7 is a cross-sectional view of the distribution fiber optic cable of FIG. 3 taken along line 7-7

As best shown in FIGS. 6 and 7, tether cable 42 refers to cable components that are disposed within, and including, tether cable jacket 20c. Tether cable 42 includes at least one tether optical fiber 12' and at least one optional strength member 41 that is strain relieved in a suitable manner for transferring tensile stresses from tether cable 42 to main cable body 25. In this cable, strength members 41 are glass-reinforced plastic (grp) rods that are introduced into the main cable body 25 and transition into tether cable 42 as shown in FIGS. 4-7.

Specifically, strength members 41 are introduced into cable 30 (i.e. embedded within the cable jacket) shortly before forming the tether cable in a length suitable to strain relief tether cable 42 with the main cable body by using a friction fit with the cable jacket. Also during this transition, tether strength members 41 reposition about tether tube 14' for influencing the cable bend characteristics of tether cable 42. In a simplified embodiment, the tether cable has a single tether strength member. The single tether strength member is introduced into the main cable body at the twelve o'clock position and makes the transition with into the tether access location riding with the tube. In variations of this embodiment, a second strength member may be introduced underneath the tube as it makes its transition to the tether access location.

Of course, using other suitable tensile members such as metal wires, fiberglass, aramid, other tensile yarns or rovings, or the like are possible. Furthermore, strength members may be strain relieved with the main cable body in other ways such securing them to the central member, or wrapping them about the cable core before transitioning them into the tether cable at the appropriate position. Still other possible tether strength member configurations are possible such as having a continuous tether strength member disposed within the cable and moving the same into and out of the main cable body, or transitioning a main cable body strength member to the tether cable.

Of course, other suitable cable cross-sections may be manufactured using the concepts of the present invention. By way of example, cables of the present invention can have any suitable construction for fiber optic tether cable 42. For instance, tether cables may have different profiles instead of oval such as round, flat and/or can include other suitable cable components. Illustratively, the tether cable may include a tether cable ripcord that extends over at least a portion of the tether cable. Using the tether cable ripcord allows for the localized tearing of tether cable jacket 20c, thereby quickly and easily providing access and/or exposing the at least one tether tube 14' within tether cable 42. The tether cable ripcord is preferably introduced into the cable when tether strength members are introduced.

Main cable body 25 also includes an optional cable core binder (not visible) for securing the cable core, at least one filler component 17, and at least one water-swellable component 19 such as a water-swellable tape or thread for blocking the migration of water along the cable. As with cable 10, filler component(s) 17 may be introduced into main cable body 25 to maintain the round shape of the cable after one of the optical fibers or tubes transitions into tether access location 18. Consequently, cable 30 maintains a round shape because filler component 17 is disposed within the cable core. As best shown in FIG. 5, filler component 17 is introduced into the cable core near access location 18, thereby taking the position of tube 14 that leaves main cable body 25 and becomes tether tube 14' within tether access location 18. Filler component 17 is preferably sized so that its outer diameter approximately matches the outer diameter of tube 14 so that the cable diameter remains relatively uniform along the length of the cable. Any suitable materials are possible for use as a filler component such as a thermoplastic rod, tube, or the like. Likewise, more than one filler component can be introduced into the cable core such as when the cable has multiple tether access locations 18 along its length. Generally speaking, filler components 17 would have different lengths that correspond with the placement of the respective tether access locations 18 along the cable.

Figure 3A:
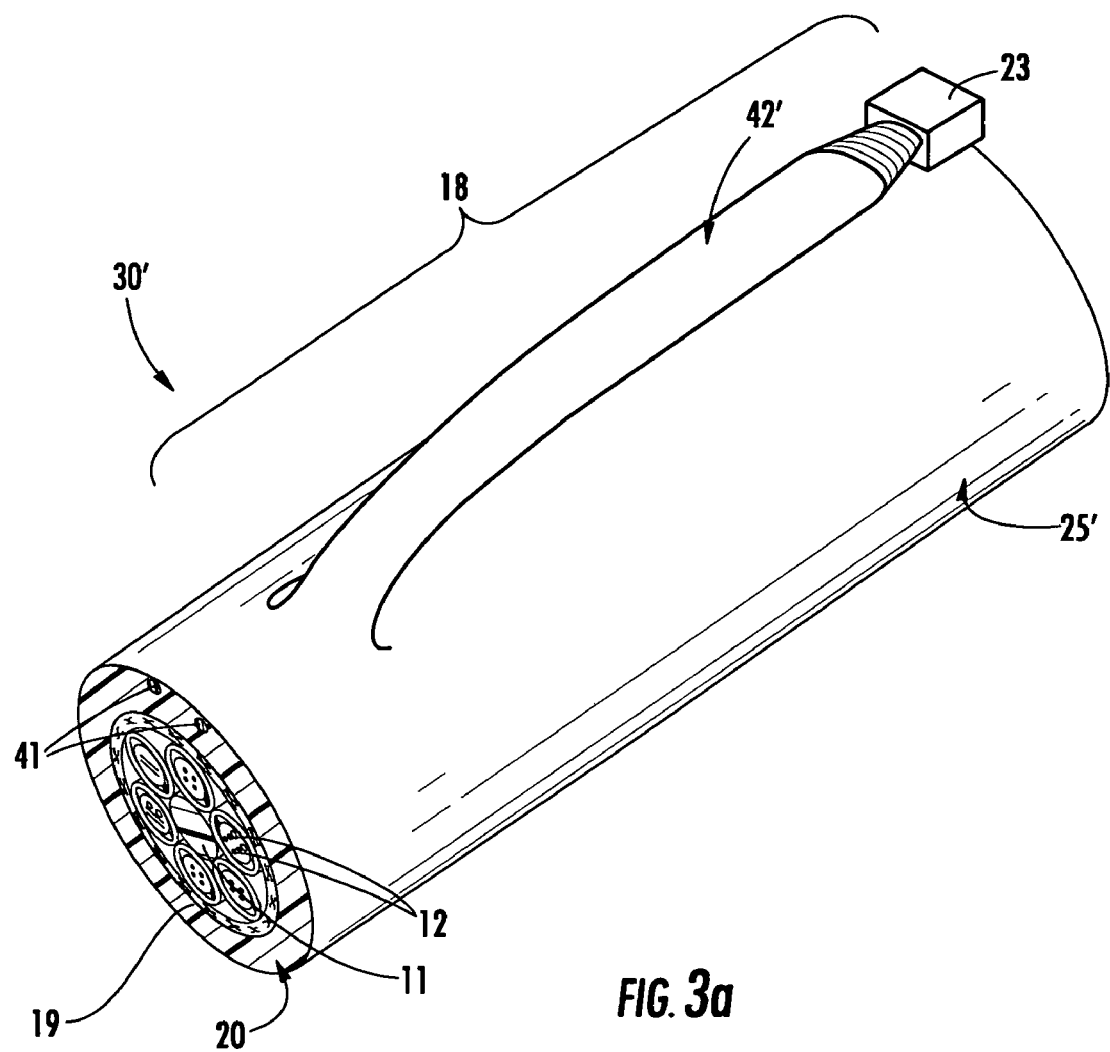
FIG. 3a is a perspective view of a distribution fiber optic cable similar to that shown in FIG. 3, except it further includes a ferrule attached to a plurality of tether optical fibers.
Figure 4:
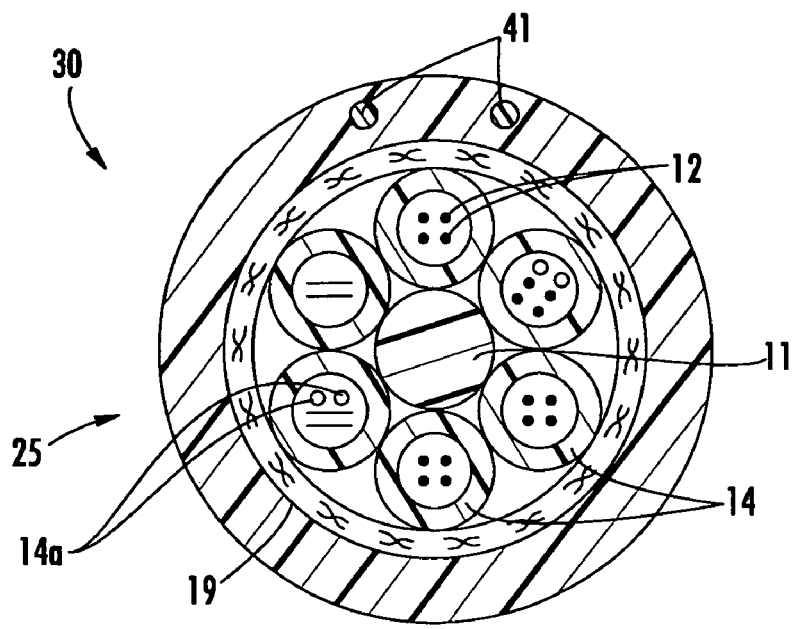
FIG. 4 is a cross-sectional view of the distribution fiber optic cable of FIG. 3 taken along line 4-4.

As used herein, cable manufacturing includes the processes or steps prior to and including cable jacketing. For instance, cable manufacturing includes transitioning one or more optical fibers from a first location to a second location and applying a cable jacket that is continuous about the tether access location. Whereas, the construction of cable assemblies as used herein includes the processes or steps after applying the cable jacket. Additionally, cables may have other suitable optional components such as ferrules, connectors, receptacles, optical splitters or the like that can be incorporated during the cable manufacturing or during the construction of cable assemblies. By way of example, FIG. 3a depicts a cable 30' similar to cable 30, but that further includes a MT ferrule 23 attached to a plurality of tether optical fibers 12' of tether cable 42'. Of course, the ferrule can have other configurations and/or be a portion of a connector such as MT, MTP, MT-RJ, SC, SCA, FC, DC, LC, or the like. In other embodiments, single-fiber ferrules or connectors may be attached to individual tether optical fibers, thereby allowing individual optical connectivity with the tether optical fibers. At any rate, attaching a ferrule, connector, receptacle, plug, or other suitable component(s) with the tether optical fiber allows for quick and easy optical mating in the factory or field. Additionally, a protective sleeve, cover, or cap (not shown) may be attached to the ferrule, connector, or receptacle for protecting the same.

Figure 8:
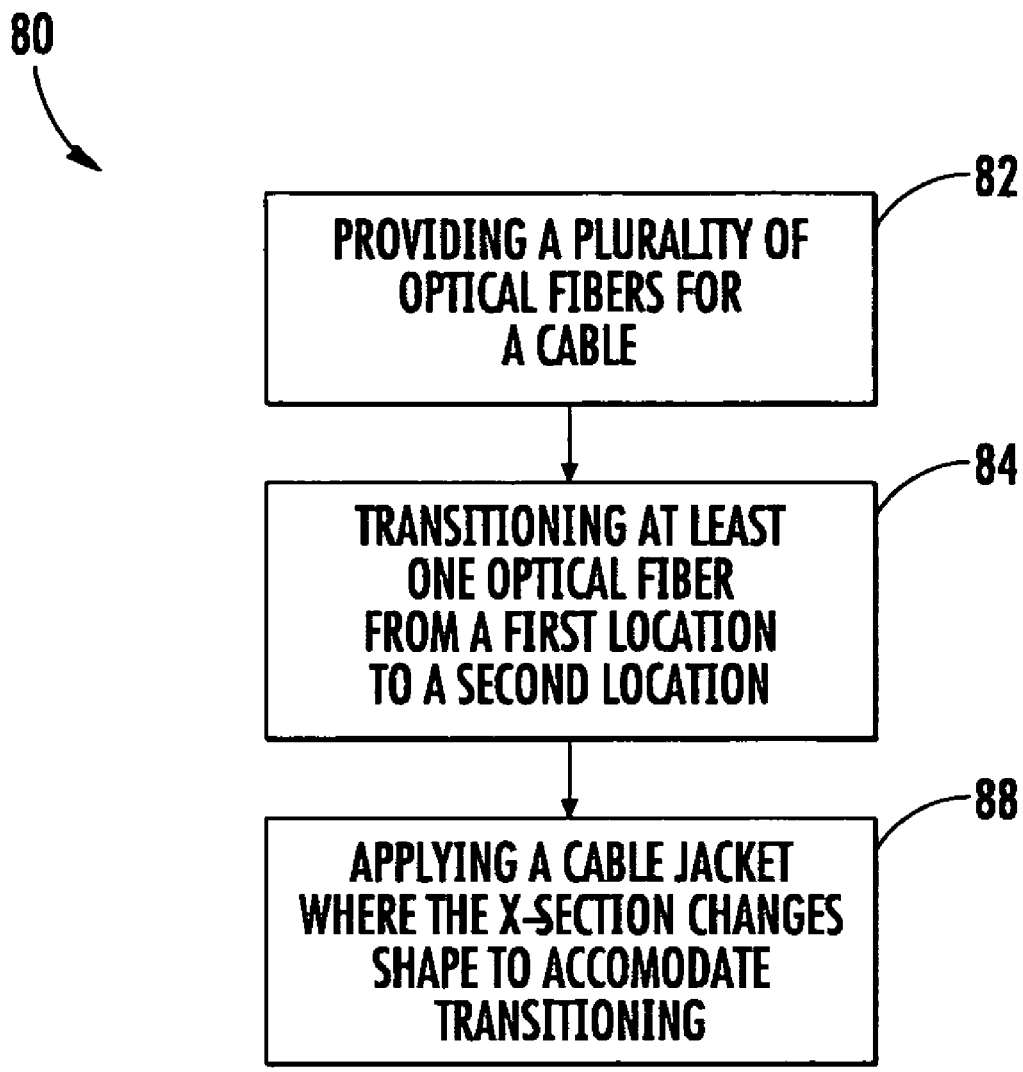
FIG. 8 is a flowchart showing manufacturing steps for distribution cables according to the present invention.

Cables of the present invention are manufactured with the main cable body and tether access location structures by altering the cable cross-section along the cable as it is manufactured. FIG. 8 is a flowchart 80 depicting manufacturing steps for cables of the present invention; of course, other additional steps are also possible. First, a step 82 of providing a plurality of optical fibers for the cable is performed. Thereafter, a step 84 is performed where at least one optical fiber of the plurality of optical fibers is transitioned from a first location to a second location such as from the main cable body to the tether access location. Finally, a step 88 of applying a cable jacket is performed where the cross-section changes shape for accommodating the tether access location (i.e. a tether port jacket portion or tether cable).

Although not represented in FIG. 8, cable manufacturing may further include steps such as providing other cable components. For instance, cable manufacturing steps may include providing one or more of the following cable components: strength members for the main cable body or tether cable; a water blocking or water-swellable component, a dry insert such as a foam having a water-swellable layer (FIG. 15), one or more ripcords, an armor layer, one or more binders, fiber optic carriers, and/or a ferrule, connector, receptacle or the like. Some steps may occur either during or after cable manufacturing and some steps are preferably performed in a cable assembly operation. An example of cable assembly is opening a portion of tether access port and connectorizing at least one tether optical fiber. Thereafter, the tether port and/or main cable body is resealed using known structures such as shrink tubing, overmolding, or the like.

FIGS. 9a-9e schematically depict a series of exemplary shapes showing the modification of the extrusion exit profiles that may be used for making the cables of the present invention. In other words, jacketing of cables may use tooling that changes shape during the extrusion process, thereby accommodating the tether access location. More specifically, gates of the tooling are controlled during cable manufacturing to change the jacket profile being applied. Of course, some embodiments of the invention may use other tooling that does not change the exit profile shape such as a vacuum draw-down operation.

Figure 9A:
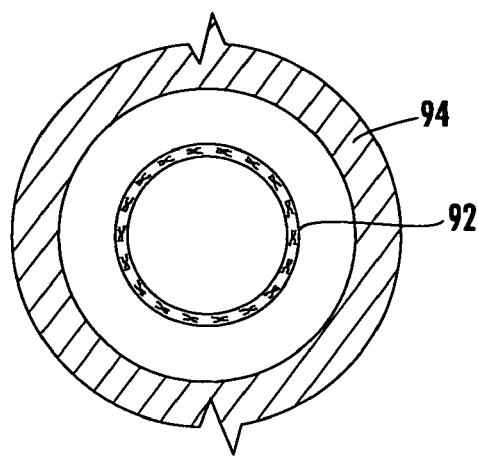
FIGS. 9a-9e schematically depicts tooling for extruding the distribution fiber optic cables of the present invention.
Figure 9B:
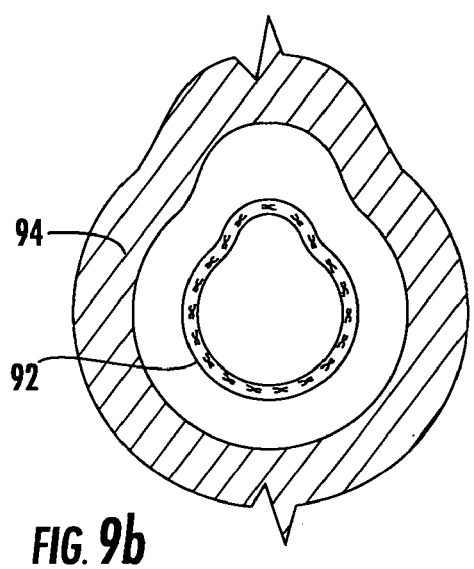
Figure 9C:
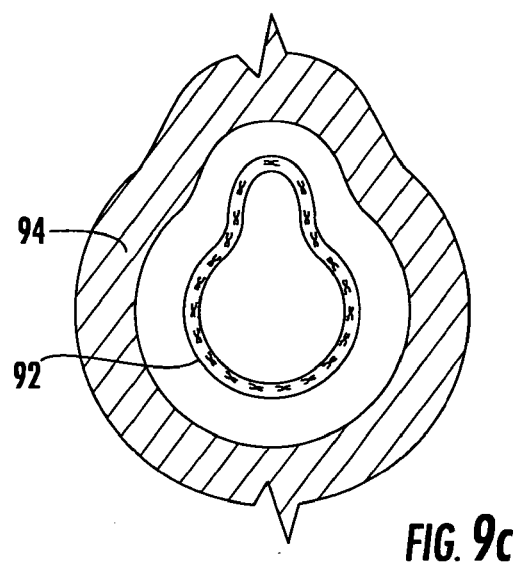

As shown by the progression of FIGS. 9a-9e, tip 92 and die 94 change their shapes as the tether tube or other fiber optic carrier transitions to become a portion of the tether access location. Specifically, FIGS. 9a-9b depict the tooling exit profiles for extruding the different cross-sections for cable 10 having the tether port 40. Whereas, the progression of FIGS. 9a-9e depict the tooling exit profiles for extruding the different cross-sections (FIGS. 4-7) of cable 30 having the tether cable 42.

In FIG. 9a, the cable components of the main cable body cable pass through a tip 92 and cable jacket material exits the space between tip 92 and die 94, thereby forming main body cable jacket 20a of cable jacket 20 (i.e. the round portion of the cable jacket). FIG. 9b illustrates that the exit profiles of tip 92 and die 94 change shape for forming the cable jacket about the tether port (i.e. the tether port jacket portion 20b). Specifically, tip 92 changes shape to accommodate tether tube 14' that is disposed apart from the main cable body and die 94 changes its shape to provide the cable jacket with a relatively uniform thickness about the cable at tether port 40. For cable 10, after the predetermined length of the tether port is reached the tooling returns to the shape of FIG. 9a for again applying the round cable jacket.

Figure 9D:
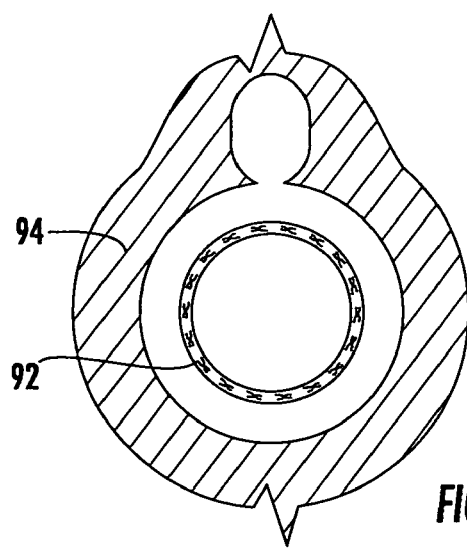
Figure 9E:
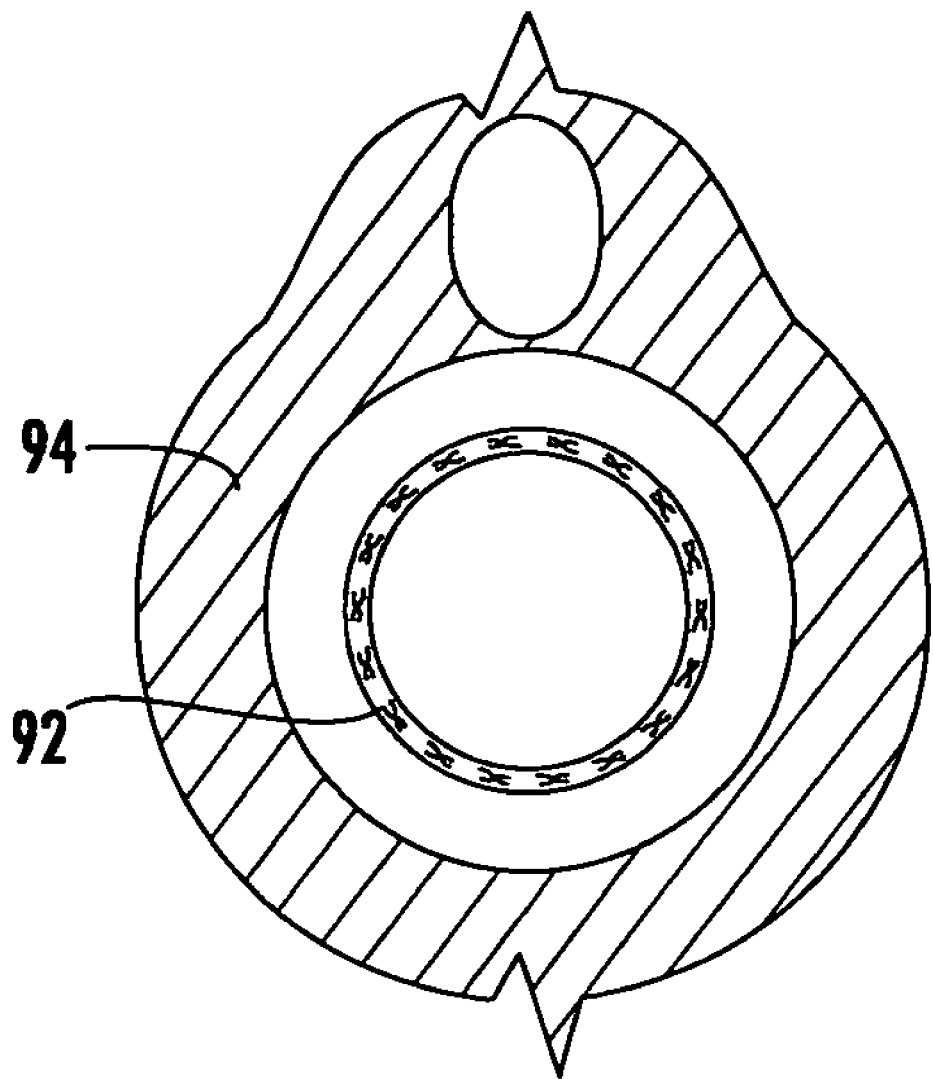

The tooling for applying the cable jacket of cable 30 is more complicated that the tooling for applying the cable jacket of cable 10. In addition to using the exit profiles shown in FIGS. 9a and 9b other changes in the applied cable jacket shapes are required to form cable 30. For instance, FIG. 3 shows a web 20d of jacket 20 that connects tether cable jacket 20c to main cable body jacket 20a. As depicted, web 20d includes a plurality of windows disposed between individual webs 20d, thereby making it easier to separate the tether cable from the main cable body over a portion of the distribution cable if required. FIGS. 9d and 9e schematically depict tooling for manufacturing the web with windows as shown. In other embodiments, the web of the jacket can be continuous along the tether cable or may be eliminated altogether. Additionally, shortly before the tether tube enters the extrusion tooling one or more tether cable strength members 41 may be introduced into the tooling or moved within the cable for providing proper strain relief for tether cable 42.

For cable manufacturing, the predetermined location of the tether access locations are identified and tracked so that cables may be manufactured according to the desired requirements. Preferably, machine controls are used for tracking the tether access location during manufacture as known in the art, thereby controlling and automating the modification of the extrusion tooling. For example, the location of the tether access location is tracked so that as it approaches the extrusion crosshead, the shape of extrusion tooling is modified to accommodate the tether access location. In other words, the cross-sectional shape being applied by the extrusion crosshead changes to accommodate the changing cross-section of the cable and then returns to an original round cross-sectional shape (e.g. FIG. 9a) after the tether access location ends. Likewise, tracking the tether access location may be used to determine when to introduce any tether strength members.

Figure 9F:
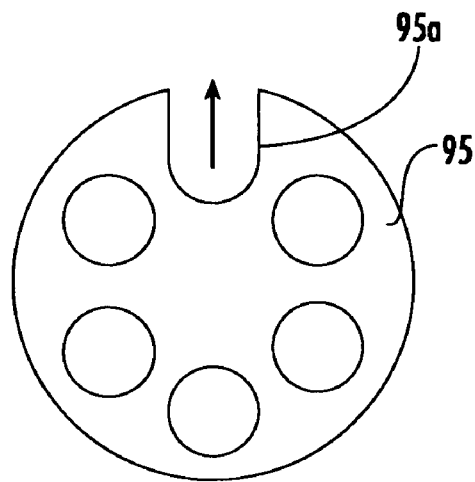
FIGS. 9f and 9g respectively are a schematic representation of a lay plate suitable for the manufacturing process and a representation showing a transition of a tube from a first location to a second location according to the present invention.
Figure 9G:
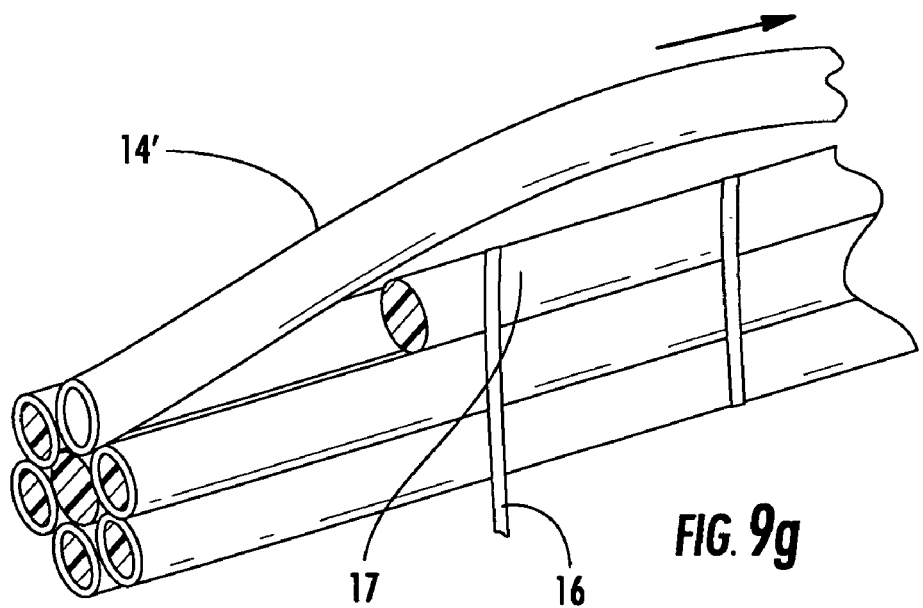

FIG. 9f is a schematic representation of an explanatory lay plate 95 for transitioning a fiber optic carrier or the like from the first location to the second location during cable manufacture as will be discussed. Specifically, FIG. 9f depicts lay plate 95 used for guiding and stranding cable components. More specifically, lay plate 95 has a plurality of apertures for routing cable components and/or fiber optic carriers such as tubes 14 of cables 10 and 30 therethrough before the cable jacket is applied. During cable manufacturing lay plate 95 may oscillate to form the stranded portion of the cable. As shown, lay plate 95 has at least one aperture 95*a* that is slotted in the radial direction and/or open to the periphery as shown by the phantom lines (other suitable lay plates may have a plurality of openings that are slotted and/or open) for allowing the cable component disposed in aperture 95*a* to move in a radial direction as shown by the arrow. During manufacturing, when the desired tether access location reaches lay plate 95*a* the tube 14 is directed radially outward to become tether tube 14' and filler element 17 is introduced into aperture 95*a* and into the main cable body 25 for stranding as represented in FIG. 9*g*. In other words, tether tube 14' is move radially outward so it is not stranded with the other cable components. Additionally, one or more optional cable core binders 16 may be used for securing the cable components together. If the tube is dedicated to the tether access location it will end within the tether access location and the filler element will remain in the main cable body. Of course, other manufacturing methods and/or variations are possible for manufacturing cables of the present invention. For instance, another apparatus uses two lay plates to make the transition, specifically, the first lay plate has a plurality of slotted openings and the second lay plate is sized to maintain the cable components within a predetermined radial distance and/or angular location during manufacturing.

Other embodiments according to the features of the present invention can eliminate the introduction of the filler component and, for instance, allow the main cable body to drop stranded tube positions so there are fewer positions in the main cable body or fill the vacated tube position with the cable jacket material. Of course, the tether access locations may have an identifying or a marking indicia like printing or striping disposed on a portion of the cable. Likewise, the marking indicia can reflect the particular tether port or tether cable disposed at the tether access location. Thus, a craftsman can easily locate and identify the tether access locations.

Figure 10A:
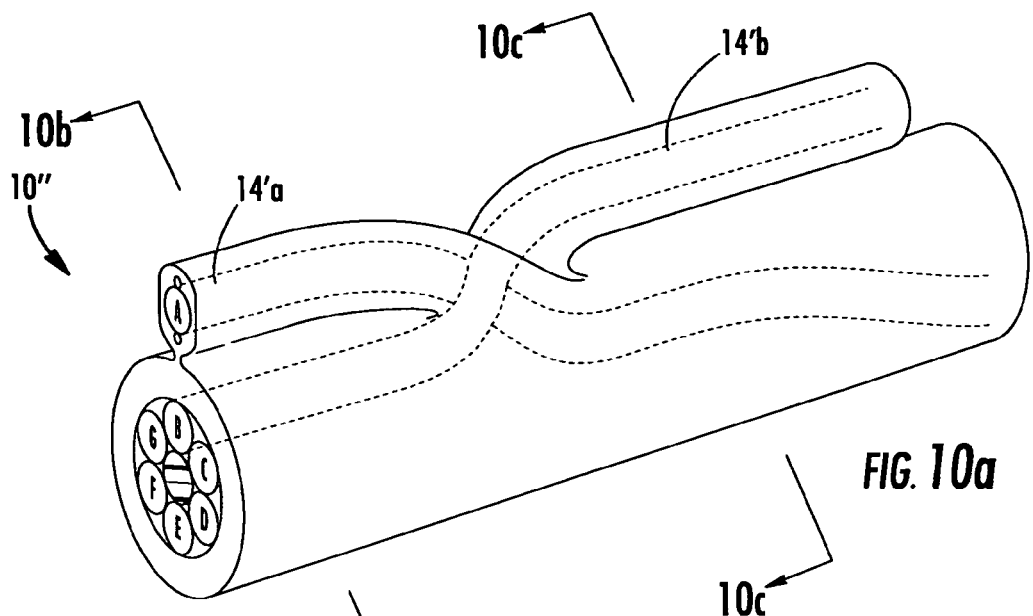
FIGS. 10a-10c respectively are perspective and cross-sectional representations of a distribution fiber optic cable showing various embodiments of the present invention.
Figure 10B:
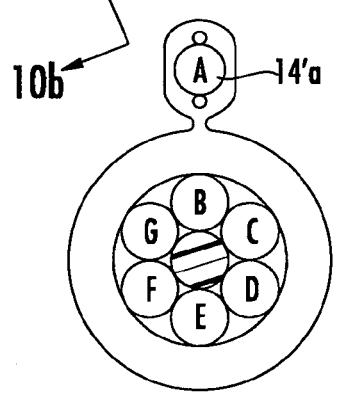
Figure 10C:
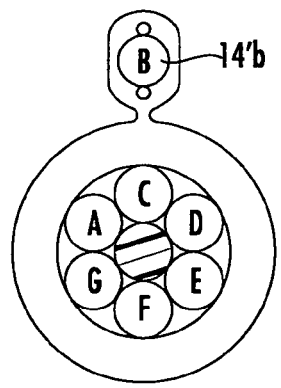

Still other embodiments of the invention the at least one optical fiber can move from within the main cable body to replace the tether optical fiber(s) that moves back into the main cable body as schematically depicted in FIGS. 10*a*-10*c* by cable 10", thereby shuffling one or more optical fibers into the tether cable and/or the main cable body as desired. Consequently, in this embodiment accessibility to one tether access location is nearly always available along the cable. When shuffling tether optical fibers, tether tubes or other tether optical fiber carriers in this manner, it may be desirable to have tether cable strength members that run the entire length of the cable. Stated another way, the tether strength members are disposed within the tether cable portion of the distribution cable along its entire length as tether optical fibers are shuffled into and out of the tether cable portion.

One advantageous distribution cable according to the present invention eliminates the filler component. By way of example, FIG. 10*a* shows a distribution cable 10" having n+1 optical fibers, groups of optical fibers, or optical fiber carriers represented by the letters A-G. FIGS. 10*b* and 10*c* depict cross-sectional representations of distribution cable 10" respectively taken along line 10*b*-10*b* and line 10*c*-10*c* showing the relative positions of optical fibers A-G at different locations along the length of distribution cable 10". As shown in FIG. 10*b*, n of the optical fibers (B-G) are disposed within the main cable body and the +1 optical fiber (A) is the tether access optical fiber that is disposed in the tether cable. Thereafter, optical fiber A transitions to become a portion of the main cable body and optical fiber B becomes the +1 access optical fiber that is disposed in the tether cable. Additionally, optical fiber A or its representation may be presented outside of the main cable body multiple times as shown by FIG. 10*a*.

By way of example, the cable of FIG. 10*a* has six (6) optical fiber carriers, i.e., tubes, within the main cable body and one (1) optical fiber carrier as the tether optical fiber carrier (i.e. a 6+1 embodiment). Tube A becomes the tether tube at multiple locations and tube B is the tether tube between the tube A distribution locations. Likewise, any suitable shuffle among the tubes A-G is possible. Moreover, this embodiment is advantageous because a tube or other suitable fiber optic carrier can present the tether optical fiber at several points along the length of the cable and/or at regular intervals. Likewise, n+m embodiments are possible where there are n optical fiber carriers within the main cable body and m tether optical fiber carriers, where m represents multiple tether optical fiber carriers. The m tether optical fiber carriers may have several tether access locations at predetermined locations and/or at regular intervals. Of course, the representations A-G can represent any suitable optical fiber, optical fiber carrier, group of optical fibers, or the like.

Figure 11A:
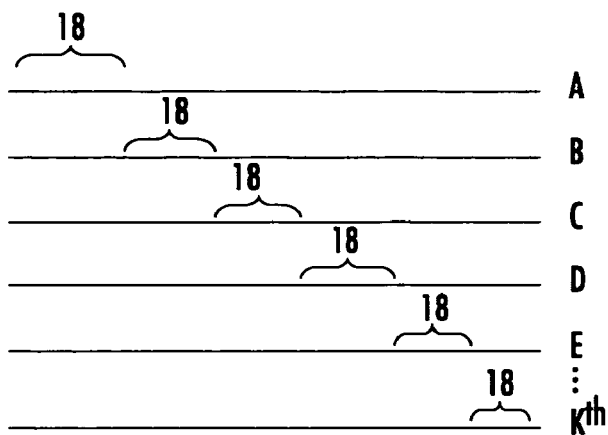
FIG. 11a and 11b are schematic representations of fiber optic cables according to the present invention.
Figure 11B:
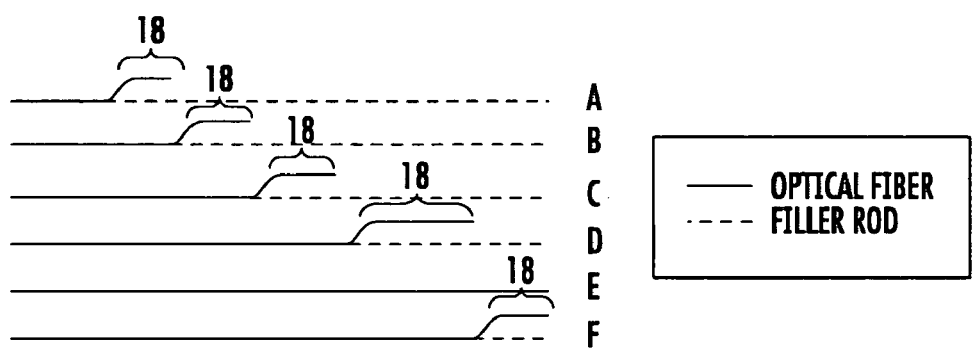

Other variations of the present invention include having more than one tether tube and/or tether optical fiber groups at a given tether access location and/or having several tether access locations along the length of the cable. Illustratively, FIG. 11*a* schematically depicts several tether access locations 18 along a cable for K optical fiber carriers or optical fibers. As shown, the tether access locations can have any suitable length. FIG. 11*b* is a schematic representation depicting a plurality of optical fibers or optical fiber carriers as solid lines and, for instance, filler components as dashed lines between cable ends. As shown, optical fibers A-D and F run less than the entire length of the cable in the main cable body and in this case are dedicated at the respective tether access locations 18, which may vary in length or have uniform lengths and/or predetermined locations or uniform locations. The transition to become the tether optical fiber or tether optical fiber carrier occurs where the solid line representation moves to the top of the respective starting point of the filler component dashed line representation. In other words, the starting point of the dashed line is where the filler component is introduced into the cable. Additionally, representation E acts as an express optical fiber or optical fiber carrier that runs the length of the cable so that the optical fibers therein are always within the main cable body. Another way of accomplishing express tubes is using two or more layers of tubes in the cable with the inner layer of tubes being express tubes that remain within the main cable body.

In other embodiments, the tether access locations have a uniform cable length between locations so that tether access locations are predictable along the length of the cable. In still other embodiments, a tether access location is nearly always available along the cable. For instance, transitions to the tether access locations may occur at a predetermined distances or spacings such as every 100 meters along a cable; however, cables may have any suitable uniform length between tether access locations.

Alternatively, tubes or fiber optic carriers within the main cable body can move to the tether access locations at predetermined positions along the length of the cable. Consequently, a service provider can provide information regarding the desired distribution locations, number of fibers desired at a given distribution location, if any express fibers are desired, etc. from a site survey and a cable can be advantageously manufactured for the specific portion of the optical network. Thus, the present invention eliminates the need for the craftsman to perform a conventional mid-span access that requires opening the cable jacket to access the desired optical fiber(s) within the cable. Moreover, the distribution location(s) provided by the present invention not only saves time during connectivity procedures but greatly reduce the risk of damage to the optical fibers compared with a conventional mid-span access procedure that requires breaching the cable jacket and finding the appropriate optical fiber.

Figures 12A, 12B:
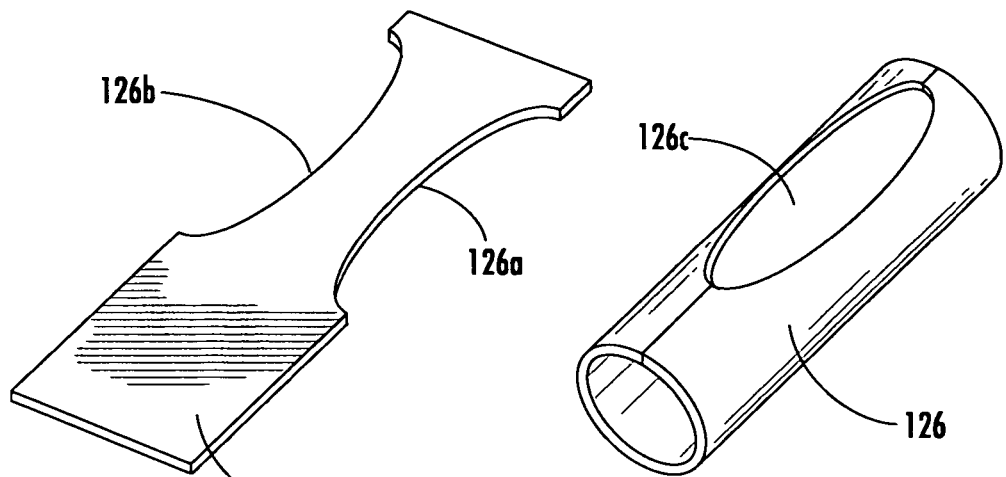
FIGS. 12a-12c depicts an armor layer and another fiber optic distribution cable similar to FIG. 2 having the armor layer.
Figure 12C:
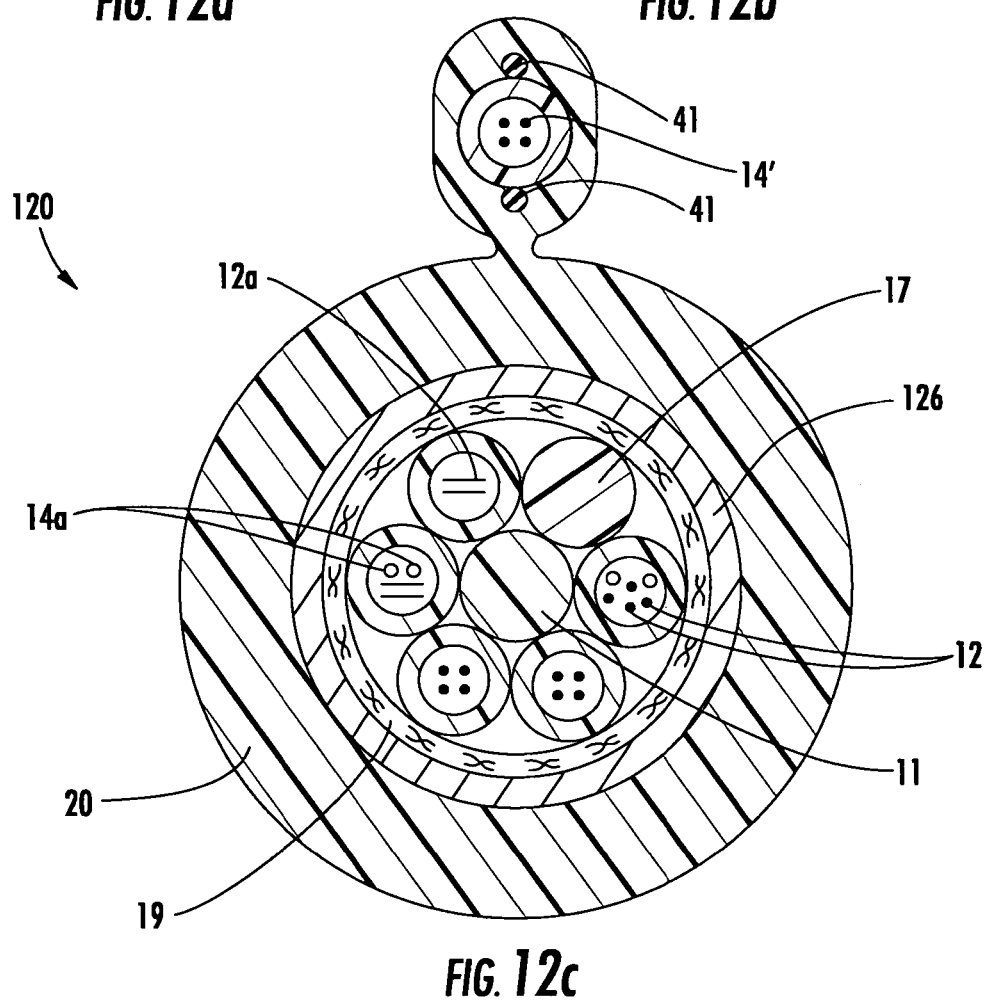

Of course, the concepts of the present invention are also applicable to other cable constructions. FIGS. 12*a* and 12*b* depict an armor layer 126 for use with cables of the present invention. Specifically, FIG. 12*a* shows an armor layer having notches 126*a*,126*b* before forming and FIG. 12*b* shows the armor layer 126 after forming where notches 126*a*,126*b* form an opening 126*c*. By way of example, opening 126*c* of armor 126 is longitudinally located where tether tube 14' transitions from the first location to the a second location so that tether tube 14' and/or tether optical fibers can pass radially outward of armor 126. FIG. 12*c* depicts a cable 120 similar to cable 30, but it further includes armor layer 126. Any suitable material is possible for armor layer 126 such as a metal or dielectric, likewise, armor layer 26 may be smooth or corrugated. Of course, if desired other cable designs of the present invention can also include an armor layer.

Figure 13:
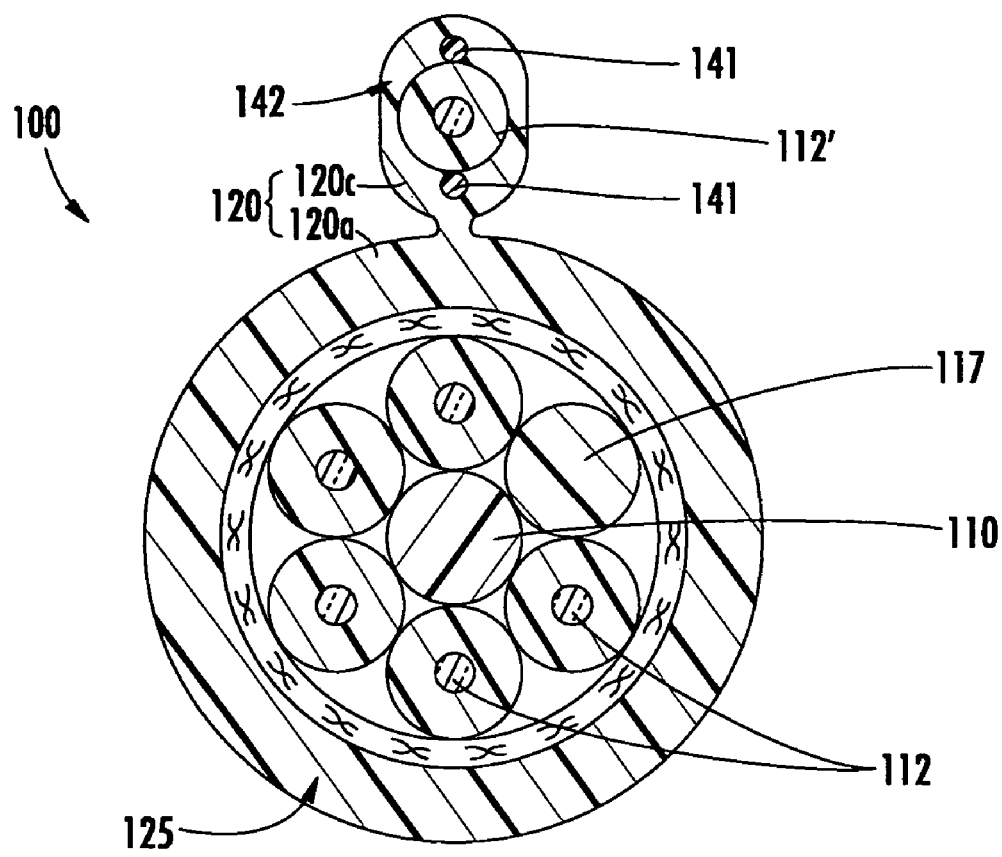
FIG. 13 depicts another fiber optic distribution cable according to the present invention.

FIG. 13 depicts a cross-section of another fiber optic cable construction according to the present invention. Specifically, FIG. 13 depicts a distribution cable 100 having optical fibers 112 that are tight-buffered and stranded along the length of the cable. Any suitable material may be used for the tight-buffer layer such as a polymer or a UV curable material. Cable 100 also includes a central member 110, at least one cable core binder (not visible), at least one filler component 117, at least one tether access location (not numbered), and a cable jacket 120. Cable jacket 120 includes a main cable body jacket 120*a* and a tether cable jacket 120*c* with a continuous transition therebetween. Cable 100 employs concepts similar to cable 30 since it includes at least one tether access location where at least one optical fiber 112 transitions from a first location within a main cable body 125 to a second location within a tether cable 142 as shown.

Like cable 30, the tether optical fibers 112' of cable 100 may continue for a predetermined distance and then may be terminated. Of course, any suitable lengths for tether optical fibers 112' are possible along with other cable variations that route at least one optical fiber into the tether cable, thereby providing the tether access location. Other variations of cable 100 include eliminating the central member, having more than one tether optical fiber at a given location, and/or having several tether cables along the length of the cable. This particular design may be advantageous in architectures where only one optical fiber is required at the distribution location such as multiple-dwelling units or distributive splitting architectures.

Figure 14:
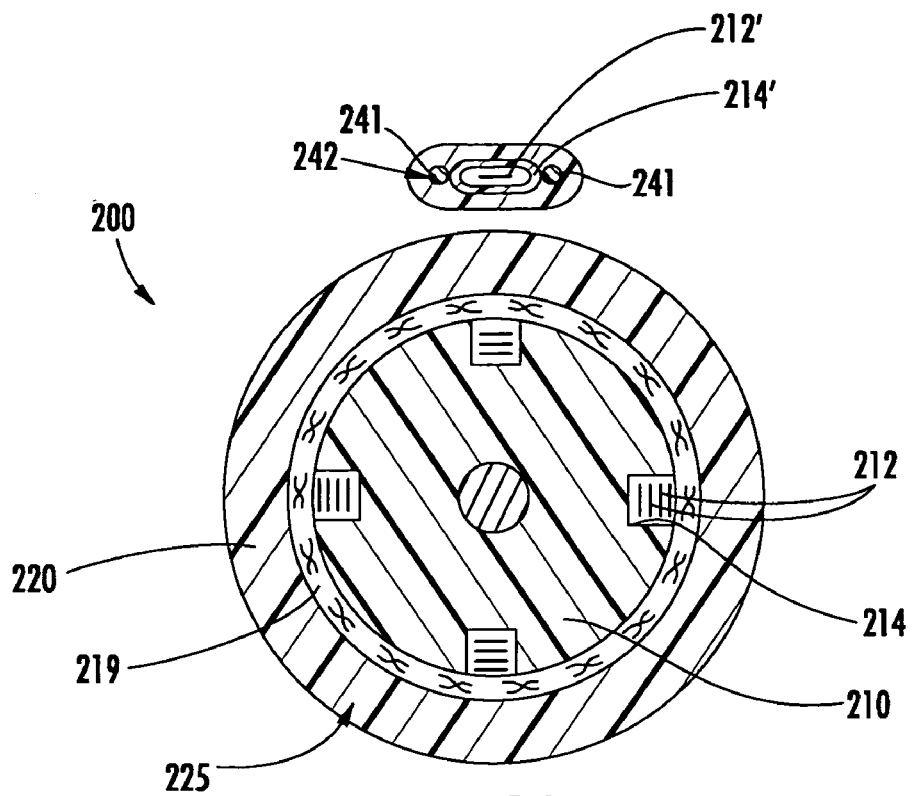
FIGS. 14-16 depict other fiber optic distribution cables according to the present invention.

Still other cable configurations according to the concepts of the invention are possible. For instance, FIG. 14 depicts a distribution cable 200 having a slotted core construction including a plurality of optical fibers 212 that are disposed within a plurality of helical slots 214 of slotted core 210. Cable 200 employs concepts similar to cable 30 since it includes at least one tether cable 242 where at least one optical fiber 212 transitions from the first location within a main cable body 225 to the second location within tether cable 242, thereby providing a predetermined tether access location for cable 200. Moreover, the given optical fiber 212 becomes a tether optical fiber 212' after it transitions from the first location within main cable body 225 to tether cable 242. In this cable, the tether optical fiber is a portion or subset of a plurality of tether optical fibers within the tether optical fiber ribbon. Of course, the tether access location could be a tether port.

Cable 200 also includes at least one water-swellable component 219 in the main cable body, specifically, cable 200 includes a water-swellable tape wrapped about slotted core 210. The water-swellable tape may be secured by at least one cable core binder (not visible) and a cable jacket 220 is extruded thereover. Consequently, the craftsman does not have to breach the main cable body to access the desired tether optical fiber 212' disposed within the tether access location. Other variations of cable 200 include having more than one tether optical fiber at a given distribution location and/or having several distribution locations along the length of the cable. The remaining optical fibers 212 within the slotted core 210 can become tether optical fibers for distribution locations in a similar manner along cable 200.

Tether optical fibers 212' are configured as a ribbon or a portion thereof and preferably have a sheath 214' shaped to receive and protect the ribbon as shown. Because cable 200 is a slotted core configuration it does not require a filler component for taking the position of optical fiber or tube that leaves the main cable body and becomes the tether optical fiber, tether ribbon, or tether tube. Consequently, cable 200 may somewhat simplify the manufacturing complexity. Cable 200 can have numerous suitable variations as discussed with other cables herein. For instance, in one embodiment the optical fibers are disposed in tubes disposed in respective slots 214, thereby protecting the optical fibers. Cable 200 could also include other water-blocking or water-swellable component(s).

Figure 15:
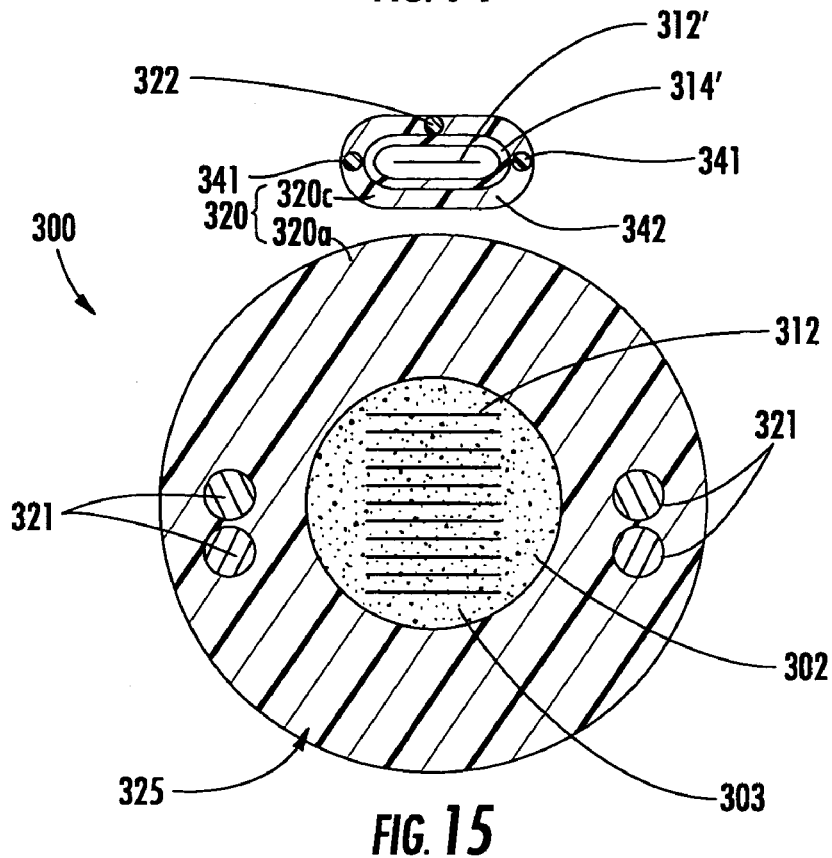

Other cable configurations according to the concepts of the invention can have optical fibers in a stack of ribbons or bundles of optical fibers in a central cavity or a central tube that is disposed within the main cable body. For instance, FIG. 15 depicts a distribution cable 300 with a tubeless construction having a plurality of optical fibers 312 in respective ribbons that are arranged in a ribbon stack. The ribbon stack can use any suitable type of ribbon. Additionally, ribbons preferably have multiples of four optical fibers and may have preferential tear portions for separating into groups of four fibers, but other configurations are possible. However, ribbons may be better suited for tether access locations having relatively short lengths due to their preferential bend characteristic, but ribbons may be used in longer tether access locations if the preferential bend characteristics are addressed, for example, by stranding the tether ribbon.

Cable 300 employs concepts similar to cable 30 since it includes at least one tether cable 342 where at least one optical fiber, in this case an optical fiber ribbon 312, transitions from the first location within the main cable body 325 to the second location within the tether cable 342, thereby providing a predetermined distribution location. Like the other cables, the tether access location may also be configured as a tether port. Moreover, a given optical fiber 312 becomes a tether optical fiber 312' after it transitions from the first location within the main cable body to a second location that is within tether cable 342. In this cable, the plurality of optical fibers 312 are disposed in a ribbon that is a portion of a ribbon stack that may be stranded within cavity 302 of cable 300. Cable 300 also includes at least one water-blocking component 303 in cavity 302, specifically, cable 300 includes a water-blocking gel 303 in the cable core. However, other embodiments can use a water-swellable component such as a compressible foam tape having a water-swellable layer as known in the art. Nonetheless, the craftsman does not have to breach the cable core to access the desired access optical fiber 312' disposed within the tether access location. Other variations of cable 300 include having more than one access optical fiber at a given access location and/or having several access location along the length of the cable.

Like cable 200, cable 300 does not require a filler component for taking the position of optical fiber or tube that leaves the cable core and becomes access optical fiber. But, cable 300 may be somewhat more difficult to manufacture than other cables of the present invention. One way to ease the manufacture of cable 300 is for all of the optical fiber ribbons to have a respective sheath 314 as shown in FIG. 15. Access optical fibers 312' preferably have a sheath 314' shaped to receive and protect the ribbon as shown. Embodiments of cable 300 can further include an access location ripcord 322 that extends over at least a portion of the access location 318 for a suitable length for quickly and easily providing access to the at least one access optical fiber 312'. Additionally, cable 300 has a plurality of strength members 321 at least partially disposed within cable jacket 320 that impart a preferential bending characteristic to the cable.

Cable 300 may have numerous variations as discussed with other cables herein. For instance, the remaining optical fibers 312 within cavity 302 can become tether optical fibers at one or more access locations in a similar manner along cable 300. Cable 300 could also include other water-blocking or water-swellable component(s).

Figure 16:
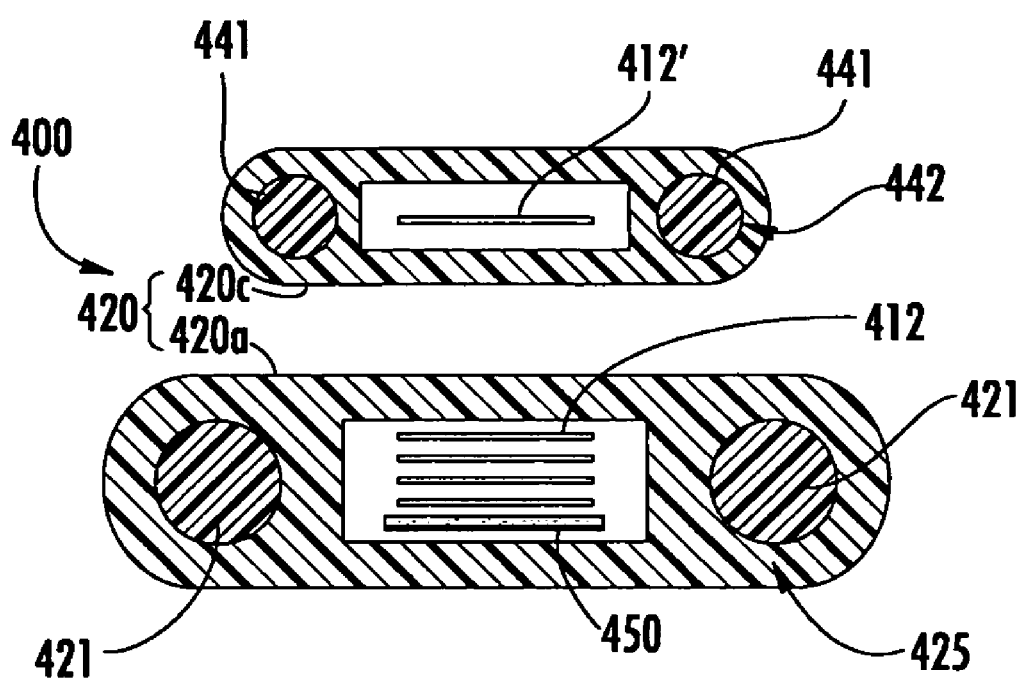

FIG. 16 depicts a cable 400 that has a main cable body 425 that is generally flat instead of being round. Main cable body includes a cable jacket 420 having a plurality of strength members 421 disposed on opposite ends of a cavity (not numbered). As shown, the cavity houses a plurality of ribbons (not numbered) each having at least one optical fiber 412. Additionally, a grease or gel may fill the cavity for inhibiting water migration along the cable, but the cavity may also house water-swellable elements such as a thread, yarn, and/or tape. Of course, other variations of this cable configuration or any other cable configurations are possible. By way of example, one embodiment may include one or more dry inserts such as a foam tape 450. Foam tape 450 may optionally include a water-swellable layer such as a water swellable tape attached thereto, thereby providing a dry cable having waterblocking capability within the cavity instead of the water-blocking grease. Using the foam tape provides, among other things, cushioning, coupling, and water-blocking within the cavity. Of course, other embodiments can use the foam tape 450 in combination with other water-swellable members such as a thread or yarn. Foam tape 450 is preferably a polyurethane foam, and more preferably an open cell polyurethane foam tape having a height of about 5 millimeters or less, but other suitable foam tapes or other dry inserts are possible. One or more foam tapes 450 are preferably disposed along a flat side of a ribbon, but other suitable arrangements such are possible about the ribbon or optical fiber. In other embodiments, each individual ribbon of cable 400 may have an individual ribbon sheath (not shown). As with the other cables, the individual tether access locations of cable 400 are configurable as a tether port or a tether cable. As shown, cable 400 has a tether cable 442, but this cable design is advantageous with a tether port that presents at least one optical fiber that can be accessed and connectorized after cable manufacturing. Thereafter, the opened tether access portion of the cable is resealed using an overmold, heat shrink tubing or the like. Moreover, the cable assembly advantageously has a relatively small footprint so that it will fit within ducts. As depicted, tether cable 442, which is similar to the main cable body 425, includes a tether cable jacket 420c having a plurality of tether strength members 441 disposed on opposite ends of a tether cavity (not numbered). Tether cavity includes at least one tether optical fiber 412 for distribution into the network.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed:

1. A distribution fiber optic cable comprising:
    a plurality of optical fibers;
    a main cable body, some of the plurality of optical fibers being disposed within the main cable body, and
    at least one tether optical fiber, the at least one tether optical fiber is one of the plurality of optical fibers that transitions during manufacturing from a first location within the main cable body to a tether access location for a portion of the distribution cable; and
    a cable jacket, wherein the cable jacket includes a main cable body jacket and a tether access jacket portion that are connected together by a continuous transition that is applied during cable manufacturing.

2. The distribution fiber optic cable of claim 1, wherein the tether access jacket is a portion of a tether cable.

3. The distribution fiber optic cable of claim 1, wherein the tether access jacket is a portion of a tether port.

4. The distribution fiber optic cable of claim 1, further comprising at least one tether strength member that is a portion of the tether access location, wherein the at least one tether strength member is attached to a portion of the main cable body for providing strain relief.

5. The distribution fiber optic cable of claim 1, the tether access location extending for a predetermined distance then ending.

6. The distribution fiber optic cable of claim 1, further comprising a plurality of tether access locations.

7. The distribution fiber optic cable of claim 1, wherein the at least one tether optical fiber returns to the main cable body.

8. The distribution fiber optic cable of claim 1, wherein the at least one tether optical fiber returns to the main cable body at a different longitudinal position along the cable and then the same optical fiber transitions into a second a tether access location at a second position along the distribution cable.

9. The distribution fiber optic cable of claim 1, the at least one tether optical fiber being disposed in a tether optical fiber carrier.

10. The distribution fiber optic cable of claim 1, further comprising a plurality of tether optical fibers disposed within the tether access location.

11. The distribution fiber optic cable of claim 1, wherein the cable has n+1 optical fibers, n of the optical fibers being disposed within the main cable body and the +1 optical fiber being the at least one tether optical fiber that is disposed in the tether access location, wherein the at least one tether optical fiber transitions into the main cable body at a predetermined position in the distribution cable.

12. A distribution fiber optic cable comprising:
    a plurality of optical fiber carriers, the plurality of optical fiber carriers extending along a portion of a longitudinal length of the distribution fiber optic cable and forming at least a portion of a main cable body;
    at least one tether optical fiber carrier;
    at least one tether optical fiber, the at least one tether optical fiber being disposed in the at least one tether optical fiber carrier, wherein the at least one tether optical fiber carrier transitions during manufacturing from a first location within the main cable body to a second location which is a tether access location for a portion of the distribution fiber optic cable; and a cable jacket, wherein the cable jacket includes a main cable body jacket and a tether access jacket portion that are connected together by a continuous transition that is applied during cable manufacturing.

13. The distribution fiber optic cable of claim 12, wherein the tether access jacket is a portion of a tether cable.

14. The distribution fiber optic cable of claim 12, wherein the tether access jacket is a portion of a tether port.

15. The distribution fiber optic cable of claim 12, further comprising at least one tether strength member that is a portion of the tether access location, wherein the at least one tether strength member is attached to a portion of the main cable body for providing strain relief.

16. The distribution fiber optic cable of claim 12, the tether access location extending for a predetermined distance then ending.

17. The distribution fiber optic cable of claim 12, further comprising a plurality of tether access locations.

18. The distribution fiber optic cable of claim 12, wherein the at least one tether optical fiber carrier returns to the main cable body.

19. The distribution fiber optic cable of claim 12, wherein the at least one tether optical fiber carrier returns to the main cable body at a different longitudinal position along the cable and then the same optical fiber carrier transitions into a second a tether access location at a second position along the distribution cable.

20. The distribution fiber optic cable of claim 12, further comprising a plurality of tether optical fibers disposed within the tether access location.

21. The distribution fiber optic cable of claim 12, wherein the cable has n+1 optical fiber carriers, n of the optical fiber carriers being disposed within the main cable body and the +1 optical fiber carrier being the at least one tether access carrier that is disposed in the tether access location, wherein the at least one tether access carrier transitions into the main cable body at a predetermined position in the distribution cable.

22. The distribution fiber optic cable of claim 12, the at least one tether optical fiber carrier being selected from the group consisting of a tube, a tight-buffer layer, a U-shaped fiber carrier, a bundle, a tape, a ribbon matrix, and a sheath.

23. The distribution fiber optic cable of claim 12, further including a fiber optic ferrule, the fiber optic ferrule being attached to the at least one tether optical fiber.

24. A distribution fiber optic cable assembly comprising:

a main cable body;

a plurality of optical fibers, the plurality of optical fibers forming at least a portion of the main cable body;

at least one tether optical fiber, the tether optical fiber being one of the plurality of optical fibers that transitions from a first location within the main cable body to a second location that is a tether access location during manufacturing, wherein the tether access location includes at least one ferrule attached to the at least one tether optical fiber and a cable jacket, wherein the cable jacket includes a main cable body jacket and a tether access jacket portion that are connected together by a continuous transition that is applied during cable manufacturing.

\* \* \* \* \*